G. W. FISHER.
VEHICLE BRAKE.
APPLICATION FILED JULY 21, 1910.
Reissued Nov. 29, 1910. 13,175.
2 SHEETS—SHEET 1.
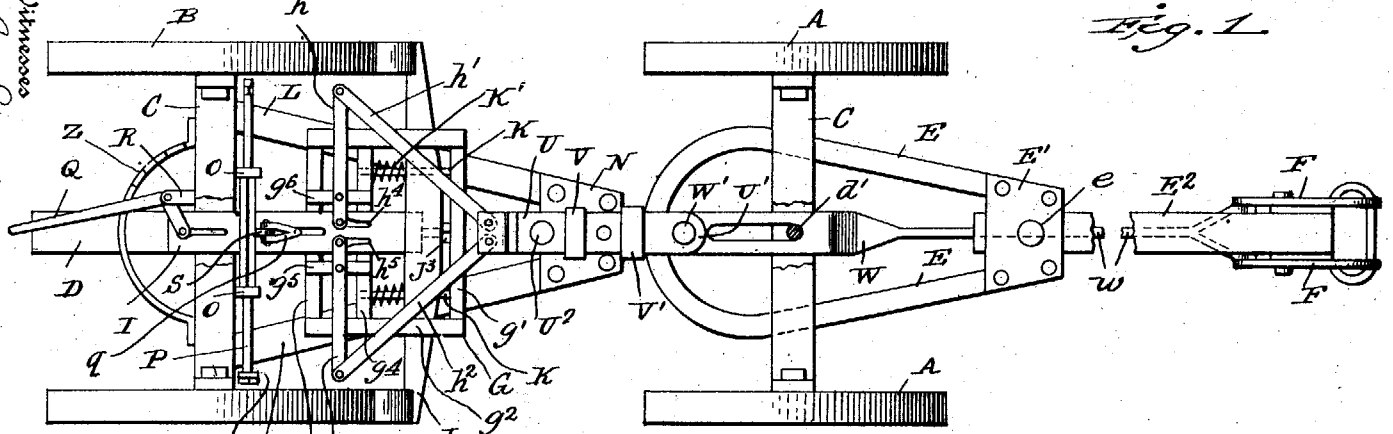
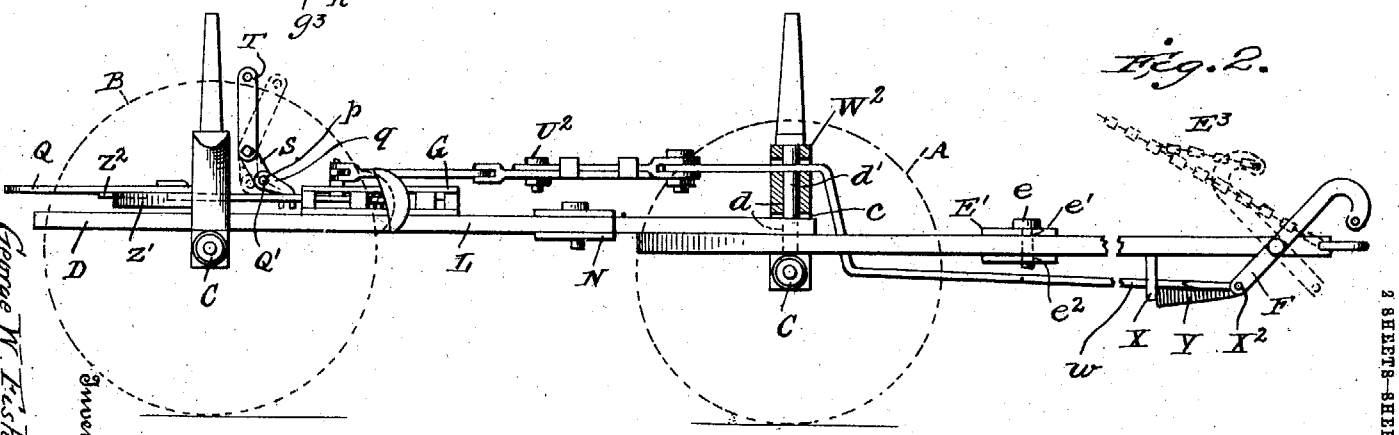
Witnesses
E. W. Longden
J. M. Copenhaver
Inventor
George W. Fisher
By Edwin L. Yewell his Attorney
THE NORRIS PETERS CO., WASHINGTON, D. C.

G. W. FISHER.

VEHICLE BRAKE.

APPLICATION FILED JULY 21, 1910.

Reissued Nov. 29, 1910. 13,175.

2 SHEETS—SHEET 2.

Witnesses
C. W. Louden
G. M. Copenhaver.

Inventor
George W. Fisher
By Edwin L. Jewell
his Attorney

THE NORRIS PETERS CO., WASHINGTON, D. C.

UNITED STATES PATENT OFFICE.

GEORGE W. FISHER, OF UPPERCO, MARYLAND, ASSIGNOR OF ONE-HALF TO L. C. CALTRIDER, OF UPPERCO, MARYLAND.

VEHICLE-BRAKE.

13,175. Specification of Reissued Letters Patent. Reissued Nov. 29, 1910.

Original No. 948,418, dated February 8, 1910, Serial No. 477,351. Application for reissue filed July 21, 1910. Serial No. 573,143.

*To all whom it may concern:*

Be it known that I, GEORGE W. FISHER, a citizen of the United States, residing at Upperco, in the county of Baltimore and State of Maryland, have invented a new and useful Vehicle-Brake, of which the following is the specification.

My invention relates to improvements in automatic brakes for vehicles, and the object thereof is to improve and simplify the construction over the existing prior state of the art; and the invention consists in the novel construction and combination of parts as will be hereinafter more in detail described and the asserted novelty specifically claimed.

Figure 3:
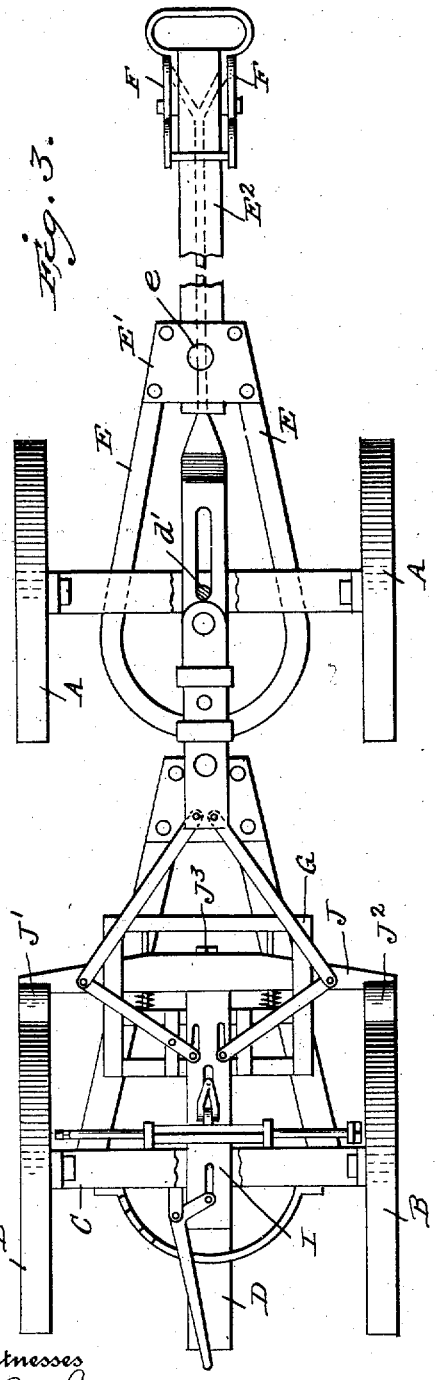
Figure 4:
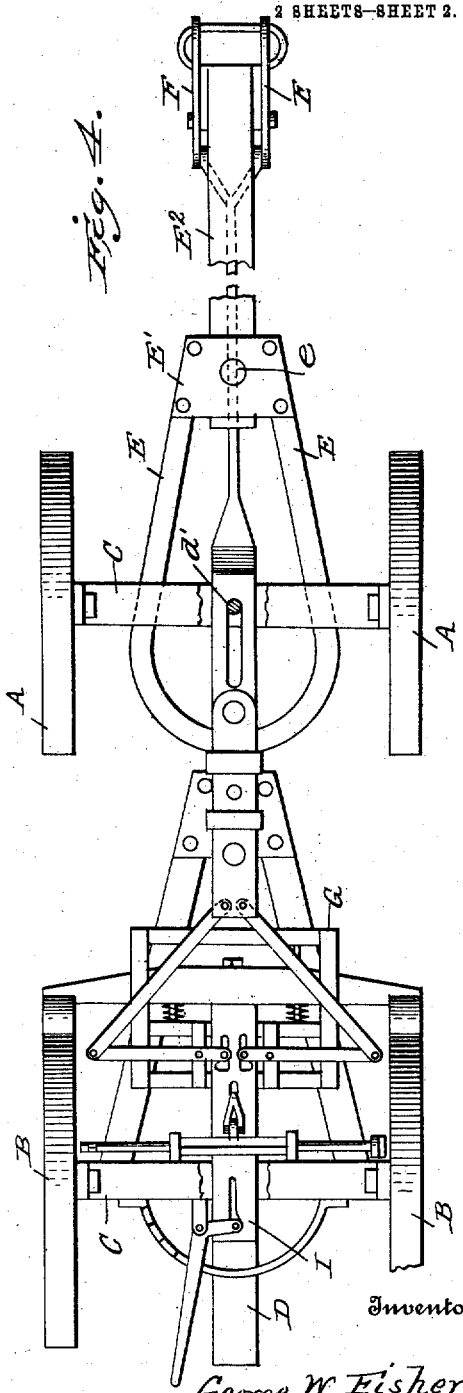

I have fully and clearly illustrated my invention in the accompanying drawings, in which, Figure 1 represents a top or plan view of my invention to which my improvements are applied. Fig. 2 represents a longitudinal side elevation of the same, and Figs. 3 and 4 are also plan views thereof.

Similar letters of reference indicate corresponding parts in the several figures.

Referring to the drawings: A, A designate the forward wheels and B, B the rear wheels of a wagon mounted upon the forward and rear axles C and C respectively in the ordinary manner.

D designates the reach or connecting bar connecting the forward and rear axles together, opening $c$ being formed centrally between the bolster and forward axle C and through which said reach is projected, the reach D and also the bolster of the forward axle C being provided with a perforation $d$ for the reception of the usual king bolt $d'$ for the turning thereon of the forward axle, bolster and reach of the wagon.

E, E designate the hounds of the forward axle which are passed transversely through the opening, between the bolster and the forward axle C and in which they are held at this point, the forward ends of said hounds being provided with a slotted clip E′ through which a tongue $E^2$ is passed and secured within the clip by means of a screw $e$ passed through perforations $e'$, $e^2$ formed in said clip and the rear end of the tongue, a tongue cap being secured to the forward end of the tongue to admit of the engagement of a chain $E^3$ and twin hooks F, F, the latter being pivotally secured to this end of the tongue, as more clearly shown in Fig. 2 of the drawings.

G designates the frame work of the brake operating mechanism of the wagon composed of side and end bars $g'$, $g^2$ and $g^3$ and an inner bar $g^4$ located parallel with the side bars $g'$ and $g^3$ and to these bars $g^3$ and $g^4$ are transversely secured short bars $g^5$ and $g^6$ which serve as a support for a number of toggle jointed levers $h$, $h'$, $h^2$, $h^3$ which are pivotally secured near their ends to said bars $g^5$ and $g^6$ the ends of said levers $h$, $h^3$ engaging parallel slots $h^4$, $h^5$ formed in and near the forward end of a bar $i$ secured centrally and at right angles to a brake shoe bar J having brake shoes J′, $J^2$ secured to its ends.

K, K designate short pins having their ends secured in the side bar $g'$ and the inner parallel bar $g^4$ near the ends of said bars on which spiral springs K′, $K^2$ loosely play backwardly and forwardly, these pins being also passed through perforations in the brake shoe bar for a purpose which will hereinafter more fully appear.

L, L designate the rear hounds, the rear ends of which are secured and passed between the rear axle C and bolster of the wagon, the forward ends of the hounds converging to the reach D and secured within the slotted clip N.

O, O designate eye-bolts secured to the rear axle C in any suitable manner. Through these eye-bolts O, O is transversely passed a roller P for side locking the wagon.

Q designates a hand lever pivotally secured to the rear axle C through the medium of an eye-bolt plate R, this lever having at its pivotal end a right angular bifurcated projection formed integral therewith having a perforation therein through which a pivot is passed pivotally connecting the right angular bifurcated projection with the slot in the bar I.

S designates a lug secured midway the length of the roller P having an eye $p$ therein through which is passed a pin Q′ for the purpose of connecting thereto a hook $q$ bifurcated at its rear end, the lug S being passed into this bifurcation. The free end of this hook engages the central slot in the bar I heretofore described. To one end of the roller P is detachably secured a hand-lever T by means of which through the medium of the roller P the hook $q$ is manipulated for operating the bar I independently of the automatically disposed drawbar to be hereinafter described.

U designates a longitudinally centrally located and automatically operated adjustable slotted draw-bar, the rear end of which is pivotally secured to the forward ends of the toggle jointed levers $h'$, $h^2$ connecting with the levers $h$ and $h^3$ of the hand operated bar I. This draw-bar U is made in sections U, U′, the ends of which are slidably passed through loops V, V′, overlapped and adjusted and held in adjustment by means of a pivot-pin $U^2$. The forward end of the section U is pivotally connected to the section U′ so that when it is necessary to adjust the overlapping sections the pivot pin $U^2$ is withdrawn from the sections. The forward end of the upper section U′ is bifurcated for the reception of the rear end of a slotted angular bar W which is pivotally connected to the forward end of said section by means of a pivot pin W′.

$W^2$ designates a bolster plate rigidly secured to the top of the bolster and provided centrally with a perforation $d$ which is in alinement with the perforation in the bolster hereinafter described, and as previously stated, is for the reception of the king bolt. This king bolt $d'$ engages the slot in the rear end of the angular portion or section of the draw-bar. The lower angle of this angular section terminates in a rod portion $w$.

X designates a slotted eye-bolt secured to the under side of the tongue through which the rod portion $w$ is passed, and which serves as a guide for said rod. This rod or rod portion of the draw-bar is bifurcated at its extreme outer and forward end, and pivotally connected therewith are the twin hooks F F″ by means of a pivot pin $X^2$ which is passed through alined perforations both in the bifurcated end of the rod and also in alined perforations in the said hooks.

Y designates a coiled spring, one end of which is secured to the slotted eye-bolt, its opposite end being looped and through which is also passed the pivot $X^2$ thus connecting said spring with the bifurcation in the rod portion of the draw-bar and the levers F F.

Z designates a ratchet sector having its ends secured to the ends of the rear hounds.

Z′ designates a brace having one end secured to the rear axle C and its opposite end secured centrally to the ratchet sector.

$Z^2$ designates a short blade secured to the underside of the lever which engages the ratchet sector by means of which the bar I and its mechanism is operated.

From the foregoing construction herein shown and described it will be obvious that my device can be operated from three different positions. Two motions are given to the brake shoes by the rear and side hand levers and by these motions the shoes of the brake bar are applied and locked against the rear wheels when the horse is descending grades and which if necessary will stop the wagon instantly. When the mechanism is operated automatically by means of the horses being controlled in descending grades the wheels will gradually be locked by the brake-shoes, and when the horses are ascending the brake-shoes will be gradually released from the wheels.

By means of the twin hooks detachably secured to the forward end of the tongue and the tongue chains secured to the tongue cap I am enabled by this means to back any load anywhere and under any circumstances, and further by the use of this means after backing up a load the twin hooks regain their normal position.

By adjusting the draw-bar which is made in two parts overlapping each other the wagon gear can be shortened or lengthened at pleasure. When two horses are controlled there can be eight tons hauled down a grade as easily as four tons.

My brake is strong and durable in its construction and in case of a runaway by the horses the stopping of the horses can be easily controlled.

Having thus described my invention what I claim as new and desire to secure by Letters Patent is:—

1. The combination with the rear axle, a bolster on said axle, rear hounds, a rear draw-bar connected to the brake-bar, provided with a slot at one end, parallel slots at the opposite end and an intermediate slot, a forward adjustable draw-bar, a lever pivoted intermediate its length on said bolster and adapted to engage one of said end slots, a roller journaled on said bolster provided with a hand lever, a hook pivoted to the roller adapted to engage said intermediate slot, and pivoted toggle levers connecting said rear and forward draw-bars.

2. The combination with the rear axle, a bolster on said axle, rear hounds, a rear draw-bar provided with a slot at one end, parallel slots at the opposite end, and an intermediate slot, a brake-bar connected to said draw-bar, a forward draw-bar, a lever pivoted intermediate its length on said bolster and adapted to engage one of said end slots, a roller journaled on said bolster provided with a hand lever, a hook pivoted to the roller adapted to engage said intermediate slot, pivoted toggle levers connecting said rear and forward draw-bars, a frame mounted on the hounds, and means connecting said frame and brake-bar to automatically return the brake-bar to its normal position.

3. The combination with a rear axle, a bolster on said axle, rear hounds, a rear drawbar provided with a slot at one end, parallel slots at the opposite end, and an intermediate slot, a brake-bar connected to said draw-bar, a forward draw-bar composed of sections pivoted together and provided with a longitudinal slot to engage the king-pin of the wagon, a tongue, a lever pivoted intermediate its length on said bolster and adapted to engage one of said end slots, a roller journaled on said bolster provided with a hand lever, a hook pivoted to the roller adapted to engage said intermediate slot, pivoted toggle levers connecting the draw bars, a hook member pivoted adjacent to the forward end of the tongue, said hook member being pivotally connected to the front end of the forward draw-bar.

4. A brake, comprising front and rear draw-bars for applying the brakes automatically through the back pull of the draft animals, and a separate means connected to said rear draw-bar for applying said brake manually.

5. A brake, comprising front and rear draw-bars for applying the brakes through the back pull of the draft animals, and a plurality of separate means connected to said rear draw-bar for applying said brake manually.

6. A brake, comprising front and rear draw-bars for applying the brakes through the back pull of the draft animals, and a separate means connected to said rear draw-bar for applying said brake manually, said draw-bars being movable independently of each other.

7. A brake, comprising front and rear draw-bars for applying the brakes through the back pull of the draft animals, and a plurality of separate means connected to said rear draw-bar for applying said brake manually, said draw-bars being movable independently of each other.

8. A brake, comprising front and rear draw-bars for applying the brakes through the back pull of the draft animals, a separate means connected to said rear draw-bar for applying said brake manually, means for returning the front draw-bar to normal position, and means for returning the brake to normal position.

9. A brake, comprising front and rear draw-bars for applying the brakes through the back pull of the draft animals, a plurality of separate means connected to said rear draw-bar for applying said brake manually, means for returning the front draw-bar to normal position, and for returning the brake to normal position.

In testimony whereof I hereunto affix my signature in the presence of two witnesses this 18th day of July, 1910.

GEORGE W. FISHER.

Witnesses:

OSCAR ALGIRE,

J. WM. KILBAUGH.